(12) United States Patent
Weiler et al.

(10) Patent No.: US 8,306,862 B2
(45) Date of Patent: Nov. 6, 2012

(54) CREATING PURCHASE ORDERS WITH MOBILE DEVICES

(75) Inventors: Thomas Weiler, Sarrlouis (DE);
Martina Wingert, Eppelborn (DE);
Timur Fichter, Schwetzingen (DE);
Thomas Schroeder, Saarbruecken (DE);
Ruediger Zuerl, Eschelbronn (DE)

(73) Assignee: SAP AG, Walldorf (DE)

( * ) Notice: Subject to any disclaimer, the term of this patent is extended or adjusted under 35 U.S.C. 154(b) by 136 days.

(21) Appl. No.: 12/533,129

(22) Filed: Jul. 31, 2009

(65) Prior Publication Data
US 2011/0029344 A1 Feb. 3, 2011

(51) Int. Cl.
*G06Q 10/00* (2012.01)
(52) U.S. Cl. ......................................................... 705/20
(58) Field of Classification Search .................. 705/8, 20
See application file for complete search history.

(56) References Cited

U.S. PATENT DOCUMENTS
2006/0212335 A1* 9/2006 Stier ................................. 705/8
2009/0307115 A1* 12/2009 Espejo et al. .................. 705/30

FOREIGN PATENT DOCUMENTS
JP 2008259147 A * 10/2008
* cited by examiner

*Primary Examiner* — Russell S Glass
(74) *Attorney, Agent, or Firm* — Fish & Richardson P.C.

(57) ABSTRACT

Among other disclosed subject matter, a computer-implemented method of remotely generating a purchase order is to be initiated. The method includes receiving a communication in an enterprise resource planning (ERP) system. The ERP system has a purchasing transaction configured for communicating with each of multiple vendor systems for performing the acquisitions. The received communication is sent wirelessly from a mobile device operated by a user. The mobile device is configured for obtaining information from the user in a process compatible with the purchasing transaction for generating a purchase order in the ERP system. The method includes generating the purchase order in the ERP system. The purchase order includes an instruction to a vendor operating a first vendor system to deliver a quantity of a product type. The method includes forwarding the purchase order from the ERP system to the first vendor system.

15 Claims, 5 Drawing Sheets

CREATING PURCHASE ORDERS WITH MOBILE DEVICES

TECHNICAL FIELD

This document relates to the generation of purchase orders.

BACKGROUND

Organizations store products for their own use or for distribution to customers. The availability of the stored products can be maintained in an enterprise resource planning (ERP) system, a system of module hardware and software units and services that communicate over a network. The ERP system can be used to procure products from a vendor. The product procurement can include the generation of a purchase order by the ERP system and transmission of the generated purchase order to the vendor.

SUMMARY

This invention relates to creating purchase orders with mobile devices.

In a first aspect, a computer-implemented method of remotely generating a purchase order is to be initiated. The method includes receiving a communication in an enterprise resource planning (ERP) system configured to manage at least acquisitions and storage of multiple product types for multiple storage locations. The ERP system has a purchasing transaction configured for communicating with each of multiple vendor systems for performing the acquisitions. The received communication is sent wirelessly from a mobile device operated by a user at a first storage location of a first product type. The mobile device is configured for obtaining information from the user in a process compatible with the purchasing transaction for generating a purchase order in the ERP system. The information identifies at least the first product type and a quantity of the first product type. The method includes generating the purchase order in the ERP system using the purchasing transaction and the information. The purchase order includes an instruction to a vendor operating a first vendor system to deliver the quantity of the first product type. The method includes forwarding the purchase order from the ERP system to the first vendor system using the purchasing transaction.

Implementations can include any or all of the following features. The received communication can include the information. The generated purchase order can not include information derived from user-input received at the ERP system subsequent to receiving the communication including the information. The ERP system can verify a validity of portions of the information before the mobile device sends the communication including the information wirelessly to the ERP system. The mobile device can be configured to obtain the information while in a state lacking wireless connectivity to the ERP system and broadcast the obtained information to the ERP system upon establishing wireless connectivity to the ERP system. The mobile device can be configured to obtain the information using a thin-client software application that relies upon the ERP system for significant processing activities. The mobile device can be configured to obtain the information by presenting a sequence of graphical user interfaces, each of the sequence of graphical user interfaces operable to collect a portion of the information. The generated purchase order can include a deliverable product location that identifies a location for delivering the product. The mobile device can include a positioning system that determines a mobile device location, and the deliverable product location can be derived from the mobile device location. The communication can include the information identifying more than one product type and quantities for each of the more than one product type. The ERP system can determine that the quantity of the first product type exceeds a maximum product quantity and can generate the purchase order using a different quantity of the first product type. The ERP system can determine that the quantity of the first product type exceeds a maximum cost and can generate the purchase order using a different quantity of the first product type. The received communication can be included in a generic purchase order request, the purchase order can be unique to the vendor and generated using information not available to the mobile device, the purchasing transaction can be configured to generate several vendor-specific purchase orders from the generic purchase order request.

In a second aspect, a computer-implemented method of remotely generating a purchase order is initiated. The method includes receiving user-input in a mobile device configured to obtain information for acquisitions of multiple product types for multiple storage locations, the user-input received from a user at a first storage location of a first product type, the user-input identifying obtained information including at least the first product type and a quantity of the first product type, the mobile device configured to collect the information in a process compatible with a generation of a purchase order in an enterprise resource planning (ERP) system. The method includes forwarding communication wirelessly from the mobile device to an ERP system, the communication including the identified information, the ERP system configured for generating the purchase order and for forwarding the generated purchase order from the ERP system to the first vendor system, the purchase order comprising an instruction to a vendor operating a first vendor system to deliver the quantity of the first product type.

Implementations can include any or all of the following features. The generated purchase order can not include information derived from user-input received at the ERP system subsequent to the forwarding of the communication. The mobile device can be configured to obtain the information while in a state lacking wireless connectivity to the ERP system and can broadcast the obtained information to the ERP system upon establishing wireless connectivity to the ERP system. The mobile device can be configured to obtain the information by presenting a sequence of graphical user interfaces, each of the sequence of graphical user interfaces operable to collect a portion of the information.

The described subject matter may provide for one or more benefits, such as eliminating the need for users performing inventory to write down product and quantity information and subsequently log in to an ERP terminal. Generating purchase order requests while near a product can reduce errors. Not only is the need to remember or write down information on a product reduced, but product information can be obtained by scanning the product or verifying computer-generated product descriptions while the product is visible to the user performing inventory. Several orders can be bundled together for transmission of the purchase order request, reducing bandwidth usage and permitting the user to review several orders and their total cost before sending the requests. Receipt of feedback while at a product location regarding whether the purchase order has been generated, what the purchase order's final terms include, and whether the purchase order has been accepted enables the user to revise the request while at the product location instead of an ERP terminal. Location identification capabilities enable the generated purchase order to identify a shipping address or product storage location without user-input identifying the product address or storage location. Further, a generation of generic purchase order requests instead of full integration into an ERP system can permit the use of mobile devices that are less expensive and are not specially configured for a particular application. The request can be generated with a thin client utilizing a generic web browser to allow greater diversity of software and hardware.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes examples for generating purchase orders using mobile devices. In some implementations, an individual may use a mobile device to generate a purchase order request for a product while at a product location in a warehouse. The mobile device may receive user input specifying information necessary to generate the purchase order, and transmit the information wirelessly to an enterprise resource planning (ERP) system. The ERP system may generate a purchase order from the received information and transmit the purchase order to a vendor for fulfillment of the order.

Figure 1:
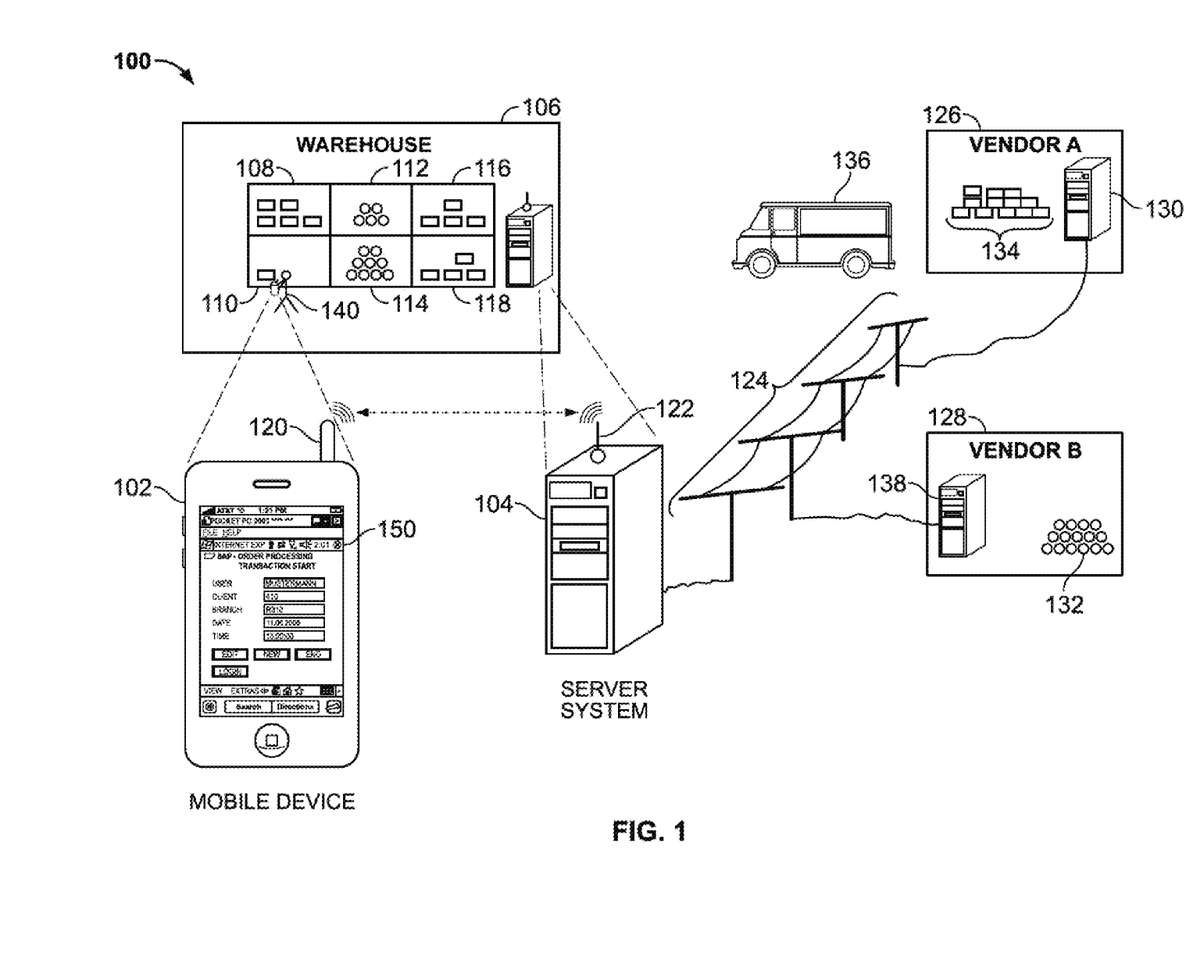
FIG. 1 schematically shows an example system for generating purchase orders with a mobile device.

FIG. 1 schematically shows an example system for generating purchase orders with a mobile device. In some implementations, mobile device 102 is carried by user 140 at an organization to enable the generation of purchase orders for various products. For example, user 140 may work in warehouse 106 for an organization that stores different types of products. User 140 may walk by a set of storage locations (e.g., the locations 108, 110, 112, 114, 116, and 118) to perform inventory and realize that an additional quantity of products for storage area 110 is required. Instead of writing down or remembering the type of product at location 110 and the location of the product before walking back to a terminal at server system 104 for accessing an ERP system (a system that manages acquisitions and storage of products for the multiple storage locations), user 140 can use mobile device 102 to generate a purchase order request. For example, the user can enter information including the type of product and the quantity of the product desired into the mobile device in response to a guided sequence of screens. Upon completion of the sequence, mobile device 102 can generate a generic purchase order request for transmission to server system 104. The ERP system at server system 104 may use data derived from the received information to generate a vendor specific purchase order request.

Mobile device 102 transmits the received information wirelessly to server system 104. The wireless transmission can include; but is not limited to; Wi-Fi, infrared, cellular, and satellite communication and protocols. The use of antennas 120 and 122 by mobile device 102 and the server system 104 may enable the wireless communication. In some examples, the mobile 102 and the server system 104 are not physically connected to each other with a conductor (e.g., a fiber-optic line or a conductive cable or contacts). In various implementations, the ERP system includes software that communicates over network 124 with vendors that supply products to the warehouse. For example, Vendor A 126 may supply products that replenish location 110 and Vendor B 128 may supply products that replenish location 112. Each vendor can operate a server (e.g., servers 130 and 132) for communication with the customer organization's ERP system. The vendors' servers can include vendor-unique ERP systems or other forms of order processing software.

Vendor's purchase order processing software receives and processes purchase orders. For example, a received purchase order may indicate that an additional quantity of products at location 110 is requested. In due time, Vendor A 126 loads truck 136 with the requested quantity of products 134 for transport to warehouse 106 and the replenishment of location 110.

In various embodiments, remote device 102 is used to generate purchase orders for organizations that do not have warehouses, but otherwise store products. For example, this document can also apply to retail stores (e.g., grocery stores and bookstores) and commercial offices (e.g., the supply of products for stock rooms of dental or accounting offices).

In some embodiments, the ERP system for the customer company operating warehouse 106 manages products for more than the one warehouse. The server system 104 may not be located at warehouse 106 or may not be located at any of the warehouses. Instead, the server system may reside at a central location. Antenna 122 can be located with the server system or separate from the server system. Where separate, the antenna may be connected to a device that rebroadcasts a wireless signal to the server system or translates the wireless communication to a protocol suitable for transmission over a physically-connected network to server system 122. In various examples, each location in warehouse 106 includes different products. In other examples, one particular product is stored among several of the locations.

Figure 2:
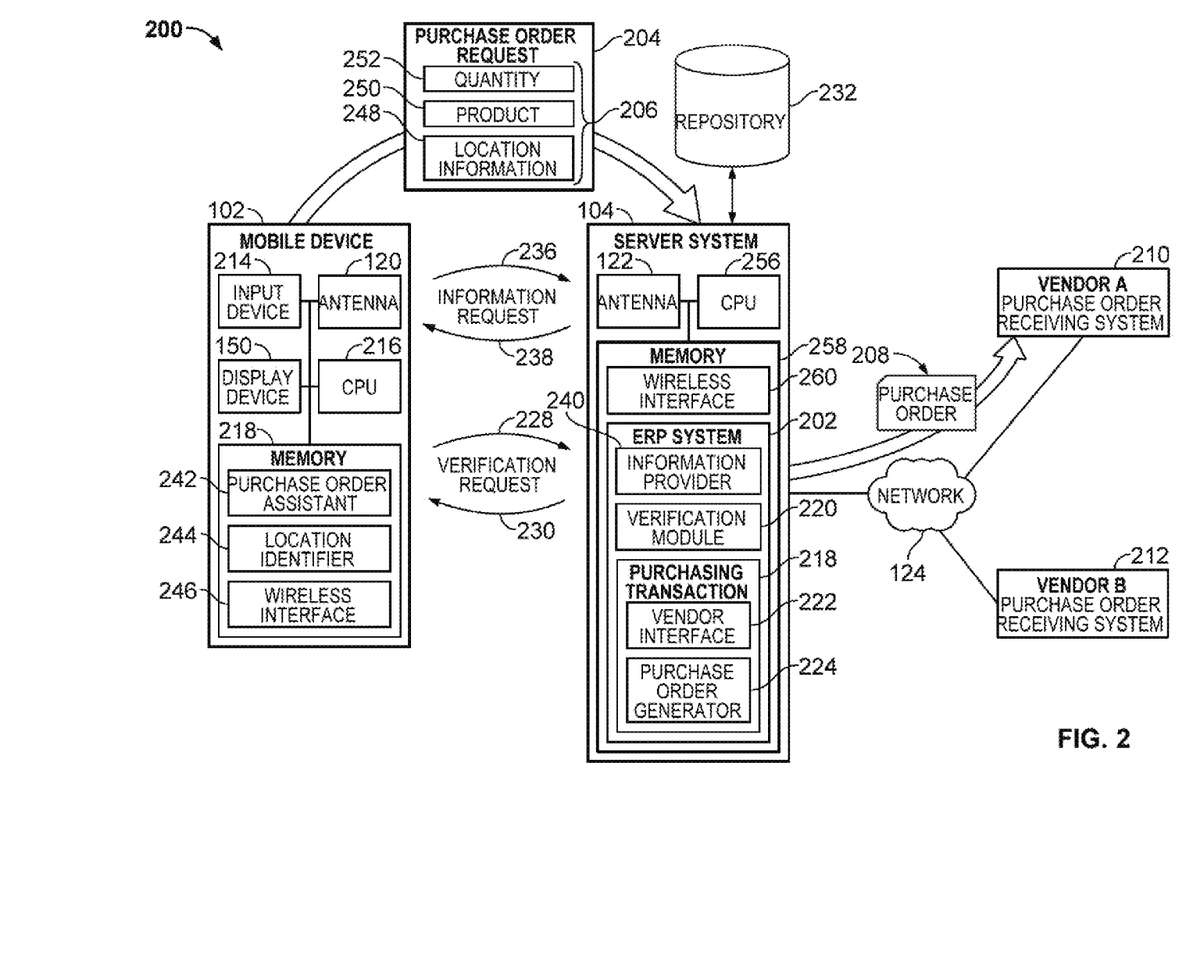
FIG. 2 is a block diagram representing the system for generating purchase orders with a mobile device.

FIG. 2 is a block diagram representing the system 200 for generating purchase orders with a mobile device. Mobile device 102 communicates wirelessly with an ERP system 202 within server system 104. Using the mobile device, a user can prompt the ERP system to generate a purchase order without being physically present at a terminal that provides access to the ERP system. Instead, mobile device 202 presents an interface for user generation of a purchase order request that includes enough information 206 to enable the ERP system to generate a purchase order.

Mobile device 102 can establish sustained or periodic wireless communication with ERP system 202. In various examples; the mobile device is a personal digital assistant (PDA); a cellular phone; a laptop computer; a net book; or a customized computing device that includes a display 150 for presenting information to a user, an input device 214 for receiving user input associated with prompts presented on display 150, an antenna 120 that enables wireless connectivity top the ERP system, a central processing unit (CPU) 216 for performing processing activities, and a memory 218 that stores information and includes modules for performing specific tasks related to the generation of a purchase order request 204. For example, a purchase order assistant 242 receives information necessary to generate a purchase order and prepares a purchase order request. Location identifier 244 calculates a location of the wireless device, a deliverable address for an ordered product, or a stocking location for an ordered product. Wireless interface 246 interfaces between the purchase order assistant 242 and the antenna 120 to translate communications into a proper format for transmission of wireless communication.

In some examples, wireless communication between mobile device 102 and server system 104 includes the transmission of digitized information over a distance through the air and without the use of an electrical conductor. The distance may be short (a few meters) or long (thousands of kilometers). A cellular network or other commercial, shared-use networks can be employed. In some implementations, mobile device 102 stores the purchase order request and uploads the request to server system 104 upon being placed in a cradle or otherwise physically connected to a network (e.g., through a USB cable).

In various implementations, display device 150 presents a series of guided displays to prompt a collection of information from user 104 for preparation of the purchase order request 204. Input device 214 can be a touch screen, keyboard, microphone, individual buttons, barcode scanner, or radio frequency identification scanner. Software that provides the graphical user interface (GUI) and receives the user input can include a thin client. For example, client software running in memory 218 of mobile device 102 may depend upon server system 104 for some or a majority of processing activities. The thin client software may focus mainly on conveying input and output between user 150 and remote server system 104. In some implementations, the thin client is an instance of a web browser or software running within the web browser.

Prompted by the displays, user 140 can supply information that enables purchase order assistant 242 to generate a purchase order request 204. The supplied information can include a product identifier, a product quantity, a product location, a vendor name, and price information (e.g., price that the user is willing to pay). In some implementations, user 140 can enter information for several products before mobile device 102 transmits the purchase order request to the server system 104. For example, user 140 may state that warehouse 106 needs seven additional of the product in location 110 and three additional of the product in location 118.

In various implementations, mobile device 102 verifies portions of information entered by the user prior to including the portions of information in a purchase order request, or prior to sending the request. For example, user 140 may use request purchase of eight additional "Red Bikes" from "John's Bike Shop." Mobile device 102 can send a verification communication 228 that includes any of the items "eight," "Red Bikes," or "John's Bike Shop" to verification module 220. Verification module 220 can check if the information is valid and transmit back to mobile device 102 a responsive verification communication 230 that indicates if the information is valid/invalid. The communication can also include additional relevant information. The additional relevant information can be responsive to a query of repository 234 (which can contain information on the vendors and their products). The responsive verification communication 230 may indicate that John's Bike Shop only has six Red Bikes; that John's Bike shop does not have any Red Bikes, but has Blue Bikes; or that John's Bike shop does not have any Red Bikes but Bennett's Bike Emporium does. The vendor's software system can be queried instead of repository 232. For example, ERP system 202 may query Vendor A's ERP or product information system.

In various implementations, the mobile device performs an information request 236. The information request can return options to populate a particular field in display 150 for selection by user 140. For example, an employee of a customer company can use the mobile device to scan a product and the device can transmit a received product identifier to the ERP system. Based upon the product identifier, information provider module 240 transmits back to mobile device 102 a list of valid choices for inclusion in the purchase order request. Example choices may include vendors that carry the scanned product, colors or other product variations for the scanned product, or available quantities.

In some implementations, purchase order request includes location information 248. The location information can include a deliverable address for the requested products, a storage location at a deliverable address for the requested products, or a region or coordinate that the purchase order request was received at or the products were identified. In various examples, identification symbols (e.g., a barcode) placed in proximity to the product location (e.g., at the storage bin) or on the product itself is scanned. The location identifier 244 can associate the identification symbols for the storage bin or the product with a specific storage or delivery location. In other examples, a user manually inputs the delivery or stocking location into the mobile device. This input can be performed in response to a specific prompt requesting a deliverable or stocking location. The input can also be performed upon a user login. For example, the login name may be associated with a particular warehouse or delivery address. In some examples, a satellite location determining unit (e.g., a GPS system) integrated into the mobile device provides a coordinate location or range. Inclusion of GPS coordinates in a purchase order or purchase order request can be especially helpful in providing location information for delivery of goods that are not stored in a structured environment. One example can include a construction site where products are arranged in convenient, yet somewhat spur-of-the-moment locations. Such products can include a pile of gravel, wire coils, timber piles, or fuel.

Upon receipt of sufficient information to generate a purchase order request, the purchase order assistant 242 can generate a purchase order request 204 and pass the request to the wireless interface 246 for transmission to server system 104. In some implementations, a user can enter information corresponding to several products before transmission. The information for several products can be consolidated into a single purchase order request or transmitted serially as several separate purchase order requests. Further, the purchase order requests can be stored or buffered in memory. The ability to buffer the requests enables the mobile device to receive purchase orders while wireless connectivity with server system 104 is not established. For example, the user may be in a portion of the warehouse that does not receive wireless signals or may turn off wireless communication to save battery life. Wireless communication may only be established for the brief period upon a user completing a purchase order request or pressing a transmit button. Buffering the requests can also provide the user the ability to review the entirety of several requests prior to their transmission.

ERP system 202 receives purchase order request 204 and converts the information stored therein to a purchase order 208 for transmission to a vendor. In some implementations, the purchase order request is a generic request that is the same template for all products and requests, regardless of the vendor. Use of a generic request permits the mobile device to operate with fast software that does not take up much memory space and need not be updated often or ever to correspond to changes in the vendor system or the ERP system 202. Further, generic and small purchase order requests can be transmitted to the server system without using much bandwidth, saving money on components or wireless service charges. If the mobile device was fully integrated into the ERP system, it may need to know the specific details of purchase orders for every vendor and may need to handle bandwidth intensive queries of repository 232. In various implementations the mobile device's only transmission with the server system 104 includes transmission of the generic purchase order request (including communications necessary to establish, maintain, and terminate the network connection). The ERP system 202 can perform the bulk of the processing activities related to purchase order generation.

Purchase order generator 224 uses the information in a purchase order request to generate a vendor specific purchase order. For example, Vendor A purchase order receiving system 210 and Vendor B purchase order receiving system 212 may operate under different protocols or process purchase orders of different templates. Purchase order generator 224 may determine the vendor for a specific purchase order request, generate a purchase order using information derived from the request, and provide the generated purchase order to vendor interface 222 for transmission to the vendor system. Purchase order generator 224 can generate the particular format of purchase order and vendor interface 222 can interface with the vendor system to transmit the purchase order under appropriate protocols. Upon sending the purchase order, the ERP system may immediately provide an acknowledgement to the mobile device of purchase order transmission or can wait until an acknowledgement is received from the purchase order receiving system. The vendor interface 222 and purchase order generator 224 can be included in a purchasing transaction 218, a module responsible for creating purchase orders using information received from the mobile device and for transmitting the generated purchase order to the vendor. In some examples, the purchasing transaction does not transmit an electronic purchase order to the vendor over a network 124, but instead requests that the purchase order be printed for physical delivery to the vendor.

A particular vendor can be specified in the purchase order request or can be determined from the product included in the request. As an example, information on the products and vendors can be stored in repository 232. The ERP system 202 can access this information to determine a vendor for a particular product. The ERP system 202 can also use the information to determine if a quantity of requested products exceeds a quantity of products available at the vendor. If so, the purchase order can be modified to include the maximum quantity of products available. The ERP system can also provide an error message to mobile device 102 that indicates the quantity available and prompts the user for a different quantity. Repository 232 can include information on products in the warehouse locations (e.g., the quantities of each product, a quantity currently being ordered, and the order history for each product), as well as order restrictions. For example, a particular user of mobile device 102 may be limited in the number of separate purchase order requests that will be processed during a specific time period, may be limited to ordering specific types of products, may be limited to ordering products for a specific location, or may not be able to generate any single purchase order—or a collection of purchase orders—that exceed a particular cost.

In some implementations, the purchase order request 204 is vendor specific. For example, the mobile device can identify the vendor for a particular product. Using the identified vendor, mobile device 102 can present vendor-specific prompts or fields for receipt of user-input. As an illustration, user 140 scans a product which mobile device 102 (alone or through communication with ERP system 202) identifies as supplied by Vendor B 128. Mobile device 102 can display screens (e.g., screens 340 and 360) that include vendor-specific fields. In this illustration, Vendor B requires a requested delivery date 364 from the user. A purchase order request specific to Vendor A may not include the requested delivery date 364 field. The ERP system is able to provide the specialized input fields not only for particular vendors, but also for particular products. In various implementations, upon receiving this threshold information, the ERP system provides the mobile device a template that the mobile device uses to construct the purchase order request. The mobile device is thus enabled to participate in the generation of complicated purchase orders. Without the ability to tailor the inputs to particular products or vendors, the mobile device would either present an unwieldy assortment of fields to the user or would be incapable of fully freeing a user 140 from terminals connected to the ERP system. Mobile device 102 can enable a user to remotely perform inventory and purchasing for all products in a warehouse, not only those that include simple ordering instructions. This ability saves great amounts of time and can improve the accuracy of product orders by eliminating the need to write information down or remember the information.

In various implementations, the processing performed by the purchasing transaction 218 or the ERP system 202 to generate a purchase order 208 includes no additional user input subsequent to receipt of the purchase order request. As an example, the server system 104 may receive a purchase order request to purchase four tennis rackets from Vendor A. The server system can generate the purchase order requesting the tennis rackets and transmit the request to Vendor A without displaying the request in a GUI to a user of a terminal of the server system and without receiving any acknowledgement from a user at a terminal of the server system that the purchase order or information contained in the purchase order is correct.

In other implementations, ERP system receives user input modifying or acknowledging purchase order requests or purchase orders generated from the requests. For example, all purchase order requests received from users of mobile devices 102 can be queued in a list. An administrator accessing the server system may verify that the purchase order requests are appropriate before the system generates the purchase orders. In some examples, the ERP system 202 can consolidate the queued requests into a single report that can be accessed and modified by the administrator. If users of separate mobile devices each requested purchase orders for the same product and location, the administrator can view the several purchase order requests for the same product and location. The administrator can modify the quantity or terms of the collective purchase order requests or can cancel purchase order requests.

In various implementations, generated purchase order 208 is transmitted to the mobile device 102 for viewing and verification by a user of the mobile device before its transmission to a vendor purchase order receiving system 210 or 212. The purchase order 208 that is sent to the mobile device can include information accessible to the ERP system but not originally accessible to the mobile device in the generation of the request. Examples of such additional information in the generated purchase order can include an address of the vendor, an estimated time of delivery, a cost of the products, tax on the products, contract terms, and vendor specific templates. The user of the mobile device can approve the purchase order, cancel the purchase order, supply revisions, or request revisions.

In some implementations, the ERP system generates a purchase order requisition document instead of a purchase order itself. A purchase order requisition is the call for purchasing to order a material or a service in a certain quantity by a certain date. On the other hand, a purchase order is the request or instruction from a purchasing organization to a vendor (external supplier) or a plant to deliver a certain quantity of material or to perform services at a certain date. The ERP system can generate a purchase order requisition using the methods identified above for generating a purchase order. In some implementations, a purchase order requisition is not the same as a purchase order request.

The server system 104 can include at least one CPU 256 for processing activities and tasks, an antenna 122 for receiving signals from the mobile device 102, a memory 258 that includes modules that perform various computations, a wireless interface 260 that interfaces between the ERP system and antenna 122 to enable wireless communication with mobile device 102, an ERP system 202, and various other modules previously described.

Figure 3A:
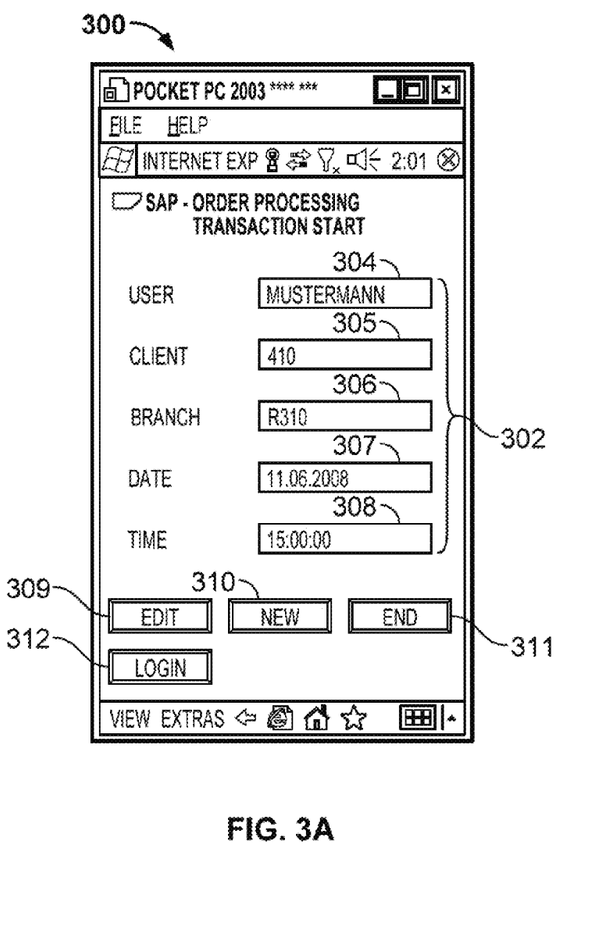
FIG. 3A is an example screen for logging into a mobile device to create a purchase order request.

FIG. 3A is an example screen 300 for logging into an application program on the mobile device to create a purchase order request. Screen 300 (and the screens of FIGS. 3B-3E) are presented by display device 150. Screen 300 can be presented upon powering on mobile device 102 or upon initiating an application that generates a purchase order request. In some examples, the application is a web browser (e.g., Internet Explorer). Screen 300 can include fields 304-308 and may fill the fields with stored login information from a previous use of the mobile device.

"User" field 304 can receive user input specifying a user or login name. "Client" field 305 can be associated with a group of users. For example, the client can indicate a portion of the customer organization that the user is included within. The client may also indicate a third-party that visits the customer organization warehouse and uses mobile devices to place purchase orders for the warehouse. The client can also include a demarcation within the ERP system. "Branch" field 306 can be associated with a particular location. For example, "R310" may be the name of warehouse 106 among several warehouses operated by the customer organization. "Date" field 307 and "Time" field 308 indicate the current date/time or the date/time of the last login.

User 140 may desire to clear the login information to enter new information by selecting the "New" button 310. User 140 can also change any displayed login information by selecting edit 309. In some examples, screen 300 does not include an edit button 309 and the fields are always editable. The date 307 and time 308 fields may be locked (i.e., not editable by a user). User 140 can logout by selecting the "End" button 311. A user can login with the information 302 by selecting the "Login" button 312. In some implementations, connectivity with server system 104 is not established upon logging into the application program.

Other fields or options can be presented in login screen 300. For example, a password field associated with the username field can be presented. A user may specify a target ERP system to login to (e.g., ERP system 202) either on screen 300 or on a screen subsequent to selecting login button 312. A list of target ERP systems can be retrieved from server system 104 and presented on the display 150 of the mobile device 102 for selection by the user. Upon logging in, a secure connection is immediately established with server system 104 (e.g., an Http Secure connection), or established only upon sending the purchase order or other requests. In various examples, mobile device 102 can validate login information using information stored locally within memory 218. The stored information can be downloaded periodically to ensure that the ERP system includes a correct listing of users. In other examples, the login validation is performed by a software component accessible through server system 104.

Figure 3B:
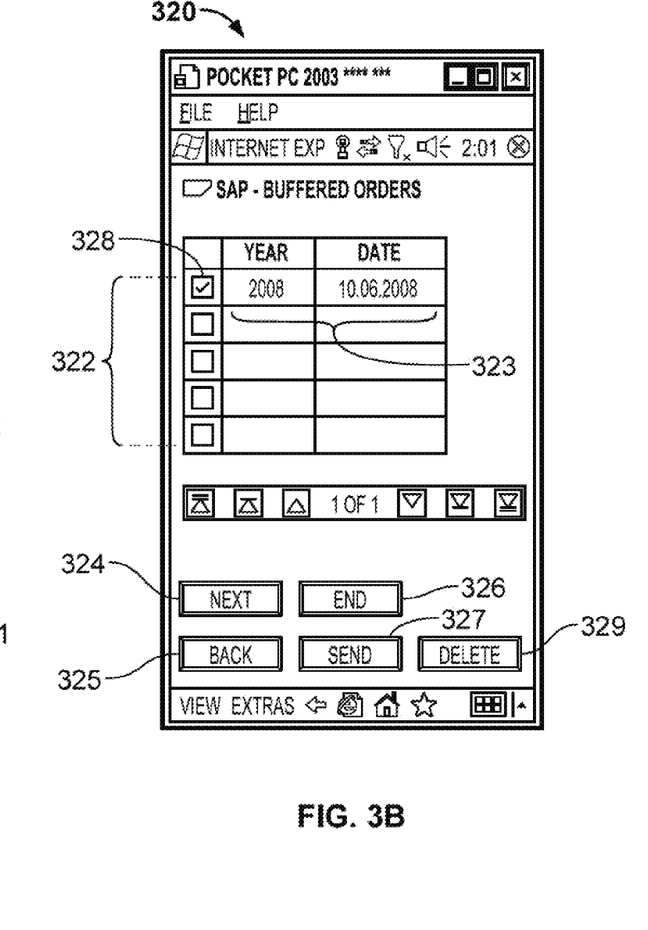
FIG. 3B is an example screen for displaying buffered purchase order requests.
Figure 3C:
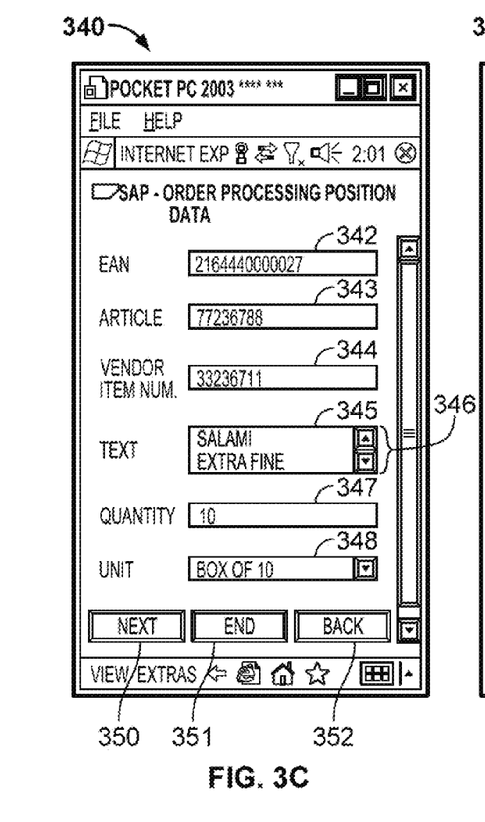
FIG. 3C is an example screen for supplying information to create a purchase order request.
Figure 3D:
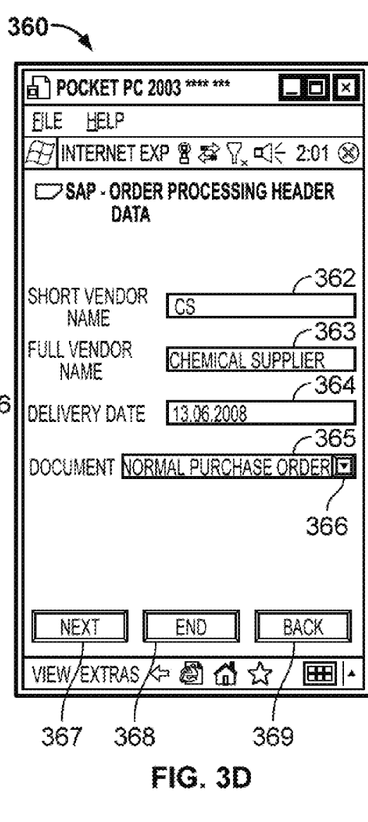
FIG. 3D is an example screen for supplying information to create a purchase order request.

FIG. 3B is an example screen 320 for displaying buffered purchase order requests. In some examples, screen 320 is a second screen in a purchase order request "wizard" or "assistant" that guides user 140 through a series of sequential screens for generating a purchase order request. Screen 320 presents a list 322 of previously completed purchase order requests that have yet to be sent to server system 104 for processing by ERP system 202. For example, screen 320 displays a single buffered request 323 that was generated on Oct. 6, 2008. A user may choose to not send buffered request 232 by selecting the "Next" button 324, may logout of the application by selecting the "End" button 326, and may return to the last screen presented by selecting the "Back" button 325. Of the buffered orders 322, checkboxes (e.g., checkbox 328) may be selected. The use of checkboxes enables a user to "Send" 327 or "Delete" 329 a subset of the buffered orders.

FIG. 3C is an example screen 340 for supplying information to create a purchase order request. In particular, the screen is one of two screens (the second being screen 360) for obtaining information about a particular order, although a different number of screens is contemplated. Screen 340 enables a user to enter a particular product and the quantity desired. The product can be identified with any of four fields 342-345. In some examples, if information is entered for one of the four fields, the remaining fields are automatically filled out by the application. "EAN" field 342 displays and allows a user to enter a product's European Article Number (EAN). In some embodiments the EAN number is supplemented, or replaced, by the product's Universal Product Code (UPC). The EAN or UPC can be manually entered by user 140, can be automatically input when user 140 scans an object, or can be automatically input through the use of an Radio Frequency Identification (RFID) scanner.

"Article" field 343 field enables a user to enter (or view) the customer company's identification number for the stored product. "Vendor Item Number" field 344 enables a user to enter (or view) the vendor's identification number for the product. "Text" field 345 displays the text description for the identified product. In this example, "Salami extra fine" has been selected. In some examples, a user can begin typing a product description into text field 345 and use input selection device 346 to scroll up and down between candidate products. As an illustration, user 140 may type "Salami" into text field 345 and be presented with two options: "Salami extra fine" and "Salami fine." The user in this example has selected "Salami extra fine." The supply of options for any particular text field can be performed by checking information in local memory 218 or repository 232 (via server system 104 and ERP system 202).

In "Quantity" field 347, the user can enter a desired quantity of products to order. A verification request 228 can be transmitted to the ERP system 202 to determine if the requested quantity is available. In "Unit" field 348, the user can select a unit for the quantity. For example, "Salami extra fine" may be shipped individually, in boxes of 10, or in boxes of 50. In this illustration, the user has selected "Box of 10." As with potentially any field, the three unit selections that are available in this example were determined by querying local memory or the remote ERP system. Upon identification of the product and the quantity, the user may select the "Next" button 350 to proceed to the next screen in the sequence. The "End" 351 and "Back" 352 buttons have already been described and operate similarly with respect to all screens. An additional field can be included in display 340 to identify a location to place the ordered product. For example, the "Salami extra fine" may be stored at locations 110 and 116, but the user may desire that the ordered product be placed at location 116 (e.g., because location 110 is being cleared for a different product). The user can indicate a desired stocking location in this additional field.

FIG. 3D is an example screen 360 for supplying information to create a purchase order request. In this example, screen 360 follows screen 340 in the guided sequence of screens, however, screen 360 can precede screen 340. Field 362 permits a user to enter a shorthand name for a vendor. In this example, the letters "CS" have been entered, which correspond to the vendor "Chemical Supplier." Field 63 can be automatically populated with the full name of the corresponding vendor in response to entering "CSCC." Where several vendors correspond to the vendor name (e.g., if user 140 only entered the letter "C"), all companies that include the letter "C," or all companies whose shorthand name includes the letter "C" can be presented in field 363 for selection by the user. In some examples, field 363 is populated with the names of all vendors and the user can select a specific vendor. The information for populating at least fields 363 and 364 can be obtained from local memory 218 or the ERP system 202. In some implementations, the vendors that are available as selections (or can be input without receiving an error) are limited to those vendors that supply the product entered in any of fields 362-364. "Delivery Date" field 364 permits the user to enter a requested date for delivery. "Document" field 365 enables a user to specify with control 366 a type of purchase order request from a list of available sections. The opportunity to select among several generic purchase order requests enables a user to enter varying degrees of information. In some examples, a user use control 366 to select whether the ERP system will generate a "purchase order" or a "purchase order requisition."

Figure 3E:
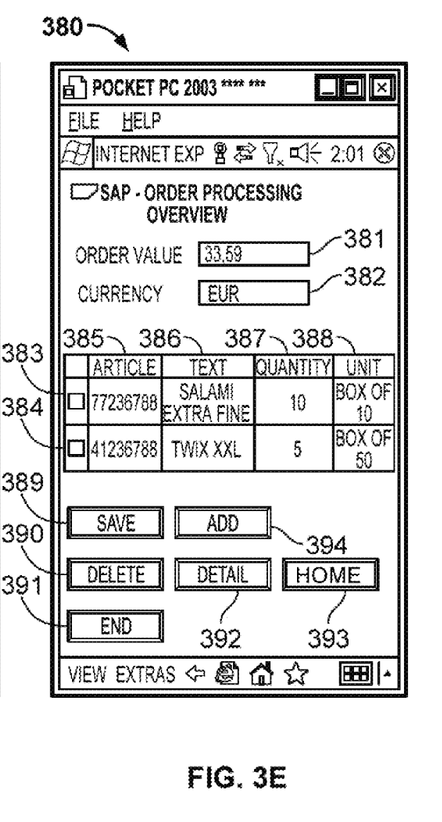
FIG. 3E is an example screen for reviewing a purchase order request.

FIG. 3E is an example screen 380 for reviewing a purchase order request. This screen enables a user to review generated purchase order requests. In this example, a user has entered information for a "Salami extra fine" purchase order request and then selected the "Add" button 394 to add a second "Twix XXL" purchase order request (i.e., screens 340 and 360 were repeated for the Twix XXL entry). The "Order Value" field 381 displays the present total of all the items listed in the overview. "Currency" field 382 identifies the currency of the order value. For each purchase order request; the Article number 385, the description 386, the quantity 387, and the unit 388 is displayed.

In some examples, upon user-selection of the "Save" button 389, the Buffered Orders screen 320 is displayed, enabling the user to send the purchase order request. A user can also delete selected purchase order requests (e.g., the Twix XXL purchase order request) using the "Delete" button 390. Additional details on selected purchase order requests can be viewed using the "Detail" button 392. Upon selection of the "End" button 391, the user is logged out.

Figure 4:
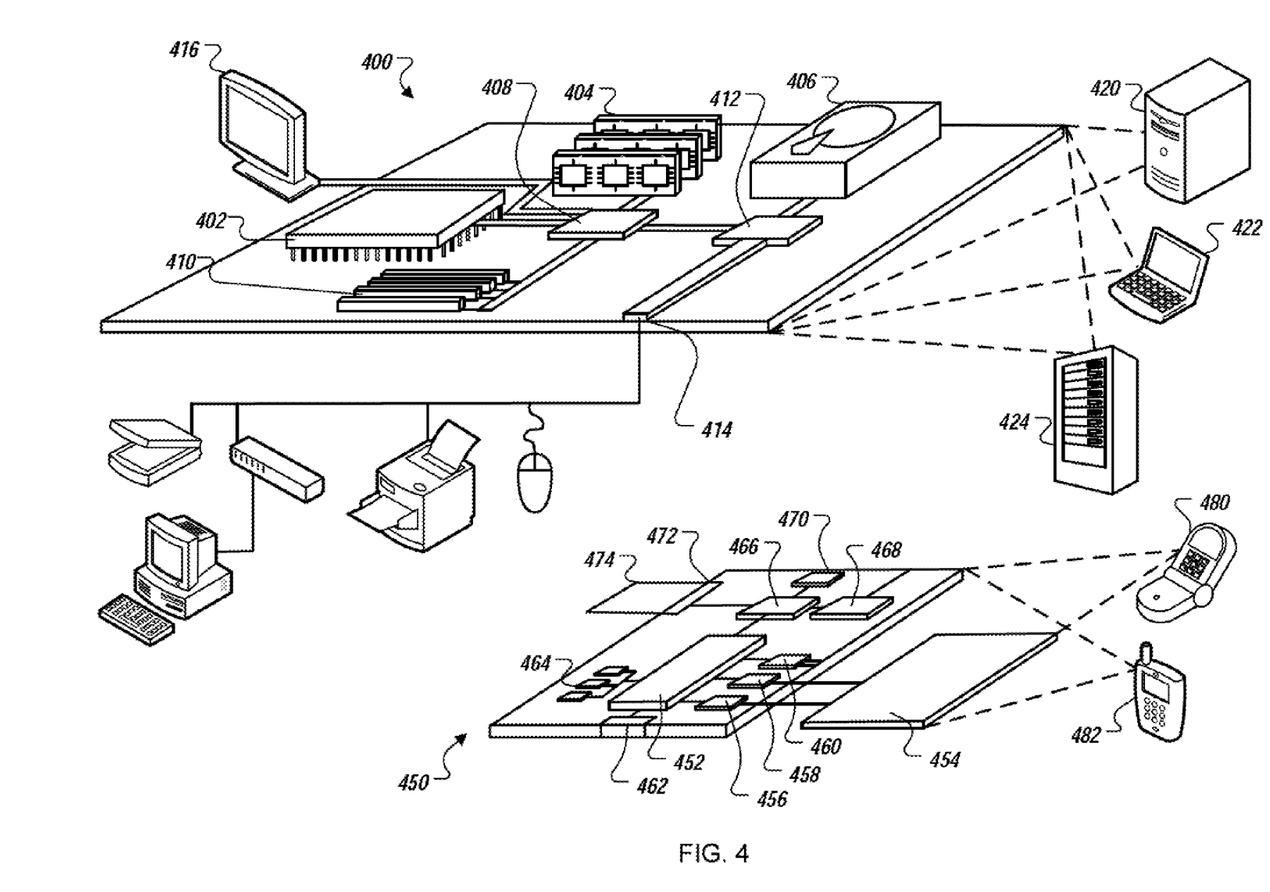
FIG. 4 is a schematic diagram of a generic computer system and a mobile computer device that can be used in connection with computer-implemented methods described in this document.

FIG. 4 is a schematic diagram of a generic computer system 400 and a mobile computer device 450 that can be used in connection with computer-implemented methods described in this document. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method of remotely generating a purchase order, the method comprising:

receiving a communication in an enterprise resource planning (ERP) system configured to manage at least acquisitions and storage of multiple product types for multiple storage locations, the ERP system having a purchasing transaction configured for communicating with each of multiple vendor systems for performing the acquisitions, the received communication being sent wirelessly from a mobile device operated by a user at a first storage location of a first product type, the mobile device configured for obtaining information from the user in a process compatible with the purchasing transaction for generating a purchase order in the ERP system, the information identifying at least the first product type and a quantity of the first product type;

generating the purchase order in the ERP system using the purchasing transaction and the information, the purchase order comprising an instruction to a vendor operating a first vendor system to deliver the quantity of the first product type, wherein the generated purchase order includes a deliverable product location that identifies a location for delivering the product, wherein the mobile device includes a positioning system that determines a mobile device location, and the deliverable product location is derived from the mobile device location; and forwarding the purchase order from the ERP system to the first vendor system using the purchasing transaction.

2. The computer-implemented method of claim 1, wherein the received communication includes the information.

3. The computer-implemented method of claim 2, wherein the generated purchase order does not include information derived from user-input received at the ERP system subsequent to receiving the communication including the information.

4. The computer-implemented method of claim 2, wherein the ERP system verifies a validity of portions of the information before the mobile device sends the communication including the information wirelessly to the ERP system.

5. The computer-implemented method of claim 1, wherein the mobile device is configured to obtain the information while in a state lacking wireless connectivity to the ERP system and broadcast the obtained information to the ERP system upon establishing wireless connectivity to the ERP system.

6. The computer-implemented method of claim 1, wherein the mobile device is configured to obtain the information using a thin-client software application that relies upon the ERP system for significant processing activities.

7. The computer-implemented method of claim 1, wherein the mobile device is configured to obtain the information by presenting a sequence of graphical user interfaces, each of the sequence of graphical user interfaces operable to collect a portion of the information.

8. The computer-implemented method of claim 1, wherein the communication includes the information identifying more than one product type and quantities for each of the more than one product type.

9. The computer-implemented method of claim 1, wherein the ERP system determines that the quantity of the first product type exceeds a maximum product quantity and generates the purchase order using a different quantity of the first product type.

10. The computer-implemented method of claim 1, wherein the ERP system determines that the quantity of the first product type exceeds a maximum cost and generates the purchase order using a different quantity of the first product type.

11. The computer-implemented method of claim 1, wherein the received communication is included in a generic purchase order request, the purchase order is unique to the vendor and generated using information not available to the mobile device, the purchasing transaction configured to generate several vendor-specific purchase orders from the generic purchase order request.

12. A computer-implemented method of remotely generating a purchase order, the method comprising:

receiving user-input in a mobile device configured to obtain information for acquisitions of multiple product types for multiple storage locations, the user-input received from a user at a first storage location of a first product type, the user-input identifying obtained information including at least the first product type and a quantity of the first product type, the mobile device configured to collect the information in a process compatible with a generation of a purchase order in an enterprise resource planning (ERP) system; and forwarding communication wirelessly from the mobile device to an ERP system, the communication including the identified information, the ERP system configured for generating the purchase order and for forwarding the generated purchase order from the ERP system to the first vendor system, the purchase order comprising an instruction to a vendor operating a first vendor system to deliver the quantity of the first product type, wherein the mobile device includes a positioning system that determines a mobile device location, and wherein the generated purchase order includes a deliverable product location that identifies a location for delivering the product, the deliverable product location being derived from the mobile device location.

13. The computer-implemented method of claim 12, wherein the generated purchase order does not include information derived from user-input received at the ERP system subsequent to the forwarding of the communication.

14. The computer-implemented method of claim 12, wherein the mobile device is configured to obtain the information while in a state lacking wireless connectivity to the ERP system and broadcast the obtained information to the ERP system upon establishing wireless connectivity to the ERP system.

15. The computer-implemented method of claim 12, wherein the mobile device is configured to obtain the information by presenting a sequence of graphical user interfaces, each of the sequence of graphical user interfaces operable to collect a portion of the information.

* * * * *